(12) United States Patent
Sekito et al.

(10) Patent No.: US 11,041,656 B2
(45) Date of Patent: Jun. 22, 2021

(54) OPENING AND CLOSING DEVICE

(71) Applicant: DENSO CORPORATION, Kariya (JP)

(72) Inventors: Yasuhiro Sekito, Kariya (JP); Ryo Kobayashi, Kariya (JP); Shinya Kato, Kariya (JP); Yuki Tsumagari, Kariya (JP); Tetsuya Matsue, Kariya (JP)

(73) Assignee: DENSO CORPORATION, Kariya (JP)

( * ) Notice: Subject to any disclaimer, the term of this patent is extended or adjusted under 35 U.S.C. 154(b) by 263 days.

(21) Appl. No.: 16/371,166

(22) Filed: Apr. 1, 2019

(65) Prior Publication Data

US 2019/0226711 A1 Jul. 25, 2019

Related U.S. Application Data

(63) Continuation of application No. PCT/JP2017/025586, filed on Jul. 13, 2017.

(30) Foreign Application Priority Data

Oct. 3, 2016 (JP) .............................. JP2016-195888

(51) Int. Cl.
*F24F 13/12* (2006.01)
*F24F 13/10* (2006.01)
*B60H 1/00* (2006.01)
*B60H 1/12* (2006.01)

(52) U.S. Cl.
CPC ......... *F24F 13/12* (2013.01); *B60H 1/00692* (2013.01); *B60H 1/12* (2013.01); *F24F 13/10* (2013.01); *B60H 2001/00728* (2013.01)

(58) Field of Classification Search
CPC ...... F24F 13/12; F24F 13/10; B60H 1/00692; B60H 1/12; B60H 2001/00728
See application file for complete search history.

(56) References Cited

U.S. PATENT DOCUMENTS 8,701,353 B2 * 4/2014 Patel ..................... E05B 85/103
49/503
2015/0283873 A1 * 10/2015 Suzuki .................... F24F 13/10
165/202

FOREIGN PATENT DOCUMENTS

| JP | H09175147 A | 7/1997 |
| JP | 2002104461 A | 4/2002 |
| JP | 2003104032 A | 4/2003 |
| JP | 2015123834 A | 7/2015 |

* cited by examiner

*Primary Examiner* — Jessica Yuen
(74) *Attorney, Agent, or Firm* — Harness, Dickey & Pierce, P.L.C.

(57) ABSTRACT

An opening and closing device includes a casing that defines an air passage, a slide door that includes a door main body slidable to open or close the air passage, and a sliding gear that is disposed on one side of the door main body in its width direction and includes first teeth in a sliding direction, and a drive gear that is rotatable around its axis line extending in the width direction and that includes second teeth in a circumferential direction around the axis line such that the first teeth and the second teeth are arranged in engagement with each other. When the drive gear rotates, a driving force is transmitted from the drive gear to the slide door through the sliding gear to slide the slide door. The door main body is restricted from shifting in the width direction due to the rotation of the drive gear.

3 Claims, 6 Drawing Sheets

OPENING AND CLOSING DEVICE

CROSS REFERENCE TO RELATED APPLICATIONS

The present application is a continuation application of International Patent Application No. PCT/JP2017/025586 filed on Jul. 13, 2017, which designated the United States and claims the benefit of priority from Japanese Patent Application No. 2016-195888 filed on Oct. 3, 2016. The entire disclosures of all of the above applications are incorporated herein by reference.

TECHNICAL FIELD

The present disclosure relates to an opening and closing device.

BACKGROUND

Some opening and closing devices include a casing providing a blowing passage, and a slide door having a door main body configured so as to be slidable to open and close the blowing passage by slide.

SUMMARY

An opening and closing device in a first aspect of the present disclosure includes a casing that defines an air passage, a slide door that includes a door main body that is configured to be slidable in a sliding direction to open or close the air passage, and a sliding gear that is disposed only on one side of the door main body in its width direction and includes first teeth in the sliding direction, and a drive gear that is configured to be rotatable around its axis line extending in the width direction and that includes second teeth in a circumferential direction around the axis line such that the first teeth and the second teeth are arranged in engagement with each other. When the drive gear rotates, a driving force is transmitted from the drive gear to the slide door through the sliding gear to slide the slide door. The door main body is configured to be restricted from shifting in the width direction due to the rotation of the drive gear. The drive gear is configured to support the sliding gear and to restrict the sliding gear from shifting in the width direction, thereby restricting the door main body from shifting in the width direction due to the rotation of the drive gear. Each of the drive gear and the sliding gear is a double helical gear extending obliquely relative to the axis line. When approaching the center of the drive gear in the width direction, the second teeth of the drive gear on the one side in the width direction extend toward one side in the circumferential direction around the axis line. When distanced away from the center of the drive gear in the width direction, the second teeth of the drive gear on the other side in the width direction extend toward an opposite side from the one side in the circumferential direction around the axis line. When approaching the center of the sliding gear in the width direction, the first teeth of the sliding gear on the one side in the width direction extend toward one side in the sliding direction. When distanced away from the center of the sliding gear in the width direction, the first teeth of the sliding gear on the other side in the width direction extend toward an opposite side from the one side in the sliding direction.

An opening and closing device in a second aspect of the present disclosure includes a casing that defines an air passage, a slide door that includes a door main body that is configured to be slidable in a sliding direction to open or close the air passage, and a sliding gear that is disposed only on one side of the door main body in its width direction and includes first teeth in the sliding direction, and a drive gear that is configured to be rotatable around its axis line extending in the width direction and that includes second teeth in a circumferential direction around the axis line such that the first teeth and the second teeth are arranged in engagement with each other. When the drive gear rotates, a driving force is transmitted from the drive gear to the slide door through the sliding gear to slide the slide door. The door main body is configured to be restricted from shifting in the width direction due to the rotation of the drive gear. The opening and closing device further includes a support portion that is configured to support the sliding gear from the other side thereof in the width direction to restrict the door main body from shifting to the other side in the width direction due to the rotation of the drive gear. The opening and closing device further includes a shaft that is configured to be rotatable around the axis line. The drive gear is provided radially outward of the shaft around the axis line. The support portion is disposed on the other side of the sliding gear in the width direction, and is provided radially outward of the shaft. The support portion is configured to rotate together with the drive gear in accordance with the rotation of the shaft.

DETAILED DESCRIPTION

Embodiments of the present disclosure will be described below with reference to the drawings. In the drawings, the same reference numerals are assigned to the same or equivalent parts in the following embodiments in order to simplify the description.

In an exemplary opening and closing device, a sliding gear is formed in a sliding direction only on one side in a width direction of the door main body of the slide door.

Further, in the opening and closing device, a spur gear which configures a rack and pinion together with the sliding gear is provided. The spur gear is placed to mesh with the sliding gear. In other words, the sliding gear and the spur gear are placed only on one side in the width direction of the door main body. When the spur gear rotates, a driving force is transmitted from the spur gear to the door main body through the sliding gear, to thereby slide the slide door.

In the opening and closing device, as described above, the sliding gear and the spur gear are disposed on one side in the width direction of the door main body. For that reason, it is conceivable that one side of the door main body in the width direction is driven by the spur gear through the sliding gear in accordance with the rotation of the spur gear, and thus when the slide door slides, the door main body is deviated in the width direction.

First Embodiment

An interior air conditioning unit 1 of an in-vehicle air conditioner employing the opening and closing device according to a first embodiment of the present disclosure will be described with reference to FIGS. 1, 2, 3A, and 3B.

Figure 1:
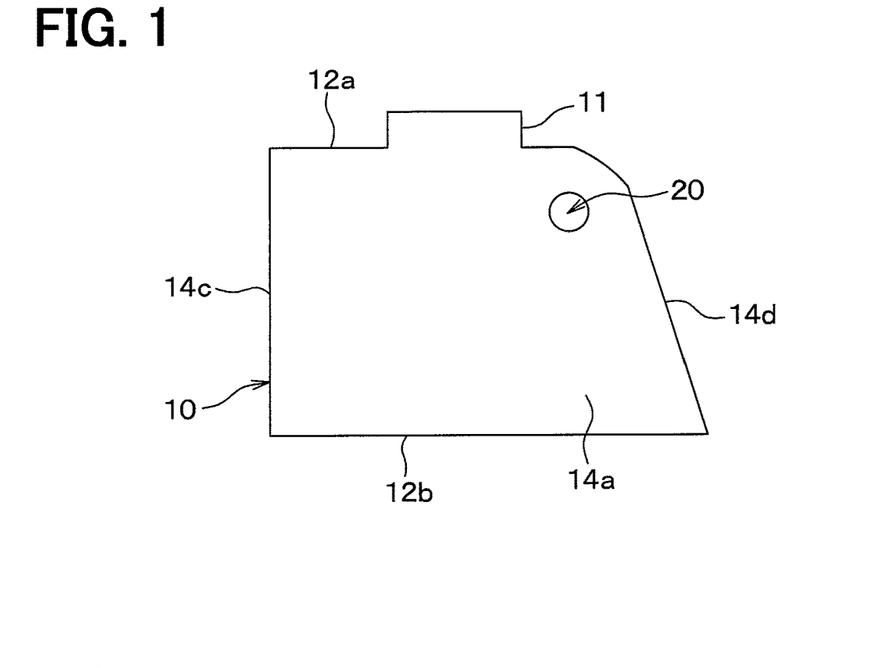
FIG. 1 is a front view of an interior air conditioning unit of an in-vehicle air conditioner according to a first embodiment.
Figure 2:
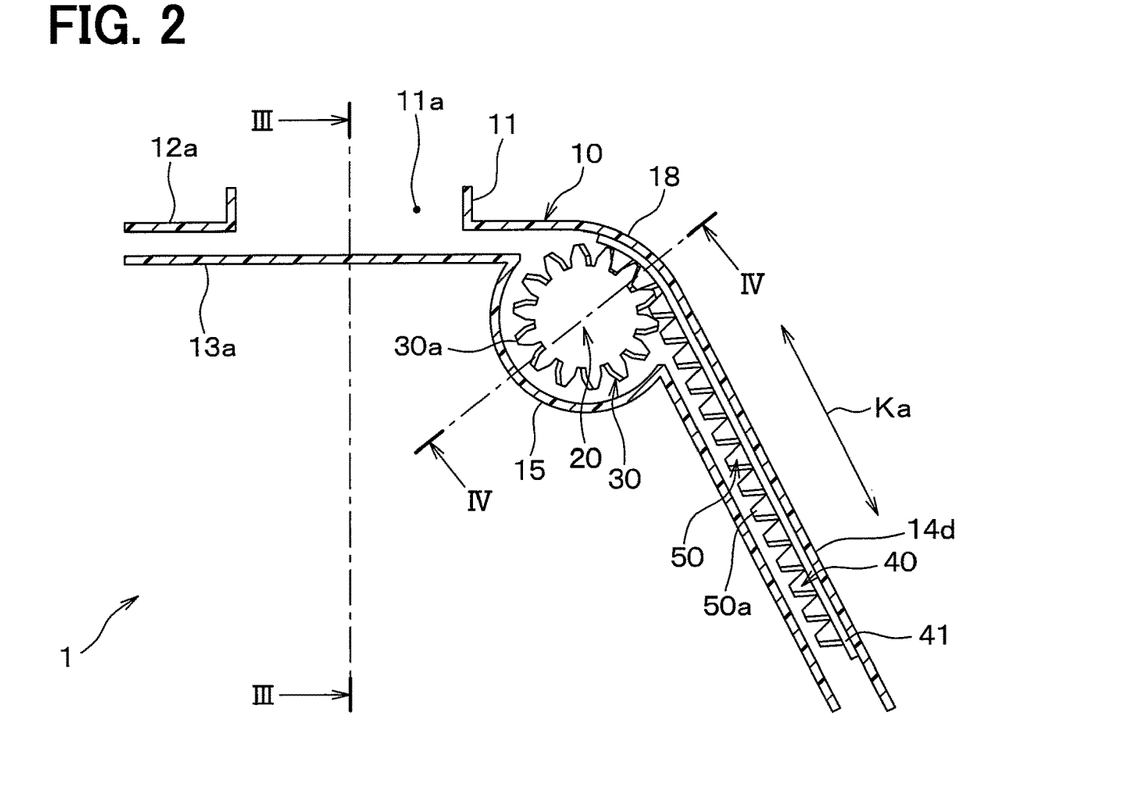
FIG. 2 is a cross-sectional view showing an internal structure in the vicinity of a blowing opening portion and a gear in an interior air conditioning unit of FIG. 1.

As shown in FIGS. 1 and 2, an interior air conditioning unit 1 according to the present embodiment includes a casing 10. The casing 10 houses a cooling heat exchanger, a heating heat exchanger, an air mix door, and the like for adjusting a temperature of an air flow blown from a blower unit. The casing 10 of the present embodiment is made of a resin material such as polypropylene.

Specifically, the casing 10 includes an upper surface 12a, a lower surface 12b, and side surfaces 14a, 14b, 14c, and 14d. The upper surface 12a is disposed so as to cover a space surrounded by the side surfaces 14a, 14b, 14c, and 14d from an upper side in a top-bottom direction. The lower surface 12b is disposed so as to block a lower side of the space surrounded by the side surfaces 14a, 14b, 14c, and 14d in the top-bottom direction.

The side surfaces 14a, 14b, 14c, and 14d define a space for accommodating the cooling heat exchangers, the heating heat exchangers, the air mix door, and the like. A blowing opening portion 11 is provided in the upper surface 12a of the casing 10.

The blowing opening portion 11 provides an air passage 11a for blowing out an air flow whose temperature is adjusted by the cooling heat exchanger, the heating heat exchanger, the air mix door, or the like into an vehicle interior. A connection portion 18 that connects the upper surface 12a and the side surface 14d according to the present embodiment is formed in a smooth curved shape.

A slide door 40 as a mode door is disposed inside the casing 10. The slide door 40 includes a door main body 41 formed in a thin plate-shape or a film shape. The door main body 41 is made of a resin material such as polypropylene so as to be elastically deformable.

The slide door 40 is configured to be slidable along the upper surface 12a and the side surface 14d of the casing 10, and opens and closes the air passage 11a by sliding.

Hereinafter, for convenience of description, a direction of sliding the slide door 40 is referred to as a sliding direction Ka, and a width direction of the slide door 40 is referred to as a width direction Kb. The width direction Kb is a direction orthogonal to a sliding direction Ka and orthogonal to a thickness direction of the slide door 40. The width direction Kb is parallel to a direction in which an axis line S of a shaft 20 and a drive gear 30, which will be described later, extends (hereinafter referred to as an axis line direction).

Rails 13a and 13b for supporting the slide door 40 from its thickness direction are provided on an inner side of the upper surfaces 12a and 14d of the casing 10 in the present embodiment.

Specifically, the rails 13a and 13b are formed so as to extend in a long plate-shape along the upper surface 12a and the side surface 14d (that is, the sliding direction Ka) respectively.

The rail 13a is supported by the side surface 14a of the casing 10. The rail 13a supports one side of the slide door 40 in the width direction Kb from the thickness direction. That is, one side of the slide door 40 in the width direction Kb is disposed between the upper surface 12a and the rail 13a. For that reason, a seal margin Sa is formed in which one side of the slide door 40 in the width direction Kb and the rail 13a overlap with each other in the thickness direction.

The rail 13b is supported by the side surface 14b of the casing 10. The rail 13b supports the other side of the slide door 40 in the width direction Kb from the thickness direction. In other words, the other side of the slide door 40 in the width direction Kb is disposed between the upper surface 12a and the rail 13b. For that reason, a seal margin Sb is formed in which the other of the slide door 40 side in the width direction Kb and the rail 13b overlap with each other in the thickness direction.

In this example, the sealing margins Sa and Sb restrict an air from flowing between an outside and an inside of the casing 10 through gaps between the side surfaces 14a and 14b of the casing 10 and the slide door 40.

In the rail 13a of the present embodiment, a housing portion 15 is formed for housing a drive gear 30, which will be described later, between a connection portion 18 of the casing 10. The housing portion 15 is formed in an arc shape convex toward the inside of the casing 10.

A sliding gear 50 in which teeth 50a (that is, first teeth) are formed along the sliding direction Ka is formed on one side of a rear surface side of the door main body 41 in the width direction Kb. In other words, the sliding gear 50 is formed so as to extend in the sliding direction Ka on one side of the rear surface side of the door main body 41 in the width direction Kb. The rear surface of the door main body 41 is a surface facing the inside of the casing 10 in the thickness direction of the door main body 41 (that is, the side opposite to the upper surface 12a). The sliding gear 50 is made of a resin material or the like, and is configured to be deformable in accordance with the deformation of the door main body 41.

The drive gear 30 is disposed on one side of the shaft 20 in the axis line direction. The drive gear 30 is a drive gear in which teeth (that is, second teeth) 30a are formed on the radially outer side of the shaft 20 about the axis line S and in the circumferential direction about the axis line S. The axis line S is a virtual line extending in the width direction Kb.

The shaft 20 is formed in a columnar shape centered on the axis line S. The shaft 20 and the drive gear 30 are integrally formed of a resin material or the like. As a result, the drive gear 30 is supported by the shaft 20. The other side of the shaft 20 in the direction of the axis line S protrudes to the outside of the casing 10 through a through hole in the side surface 14a of the casing 10.

As a result, the drive gear 30 and the shaft 20 are respectively configured to be rotatable about the axis line S with respect to the side surface 14a of the casing 10. The drive gear 30 and the sliding gear 50 configure a rack and pinion. The shaft 20 is rotated about the axis line S by an electric motor or an operation force of a user.

Figure 3A:
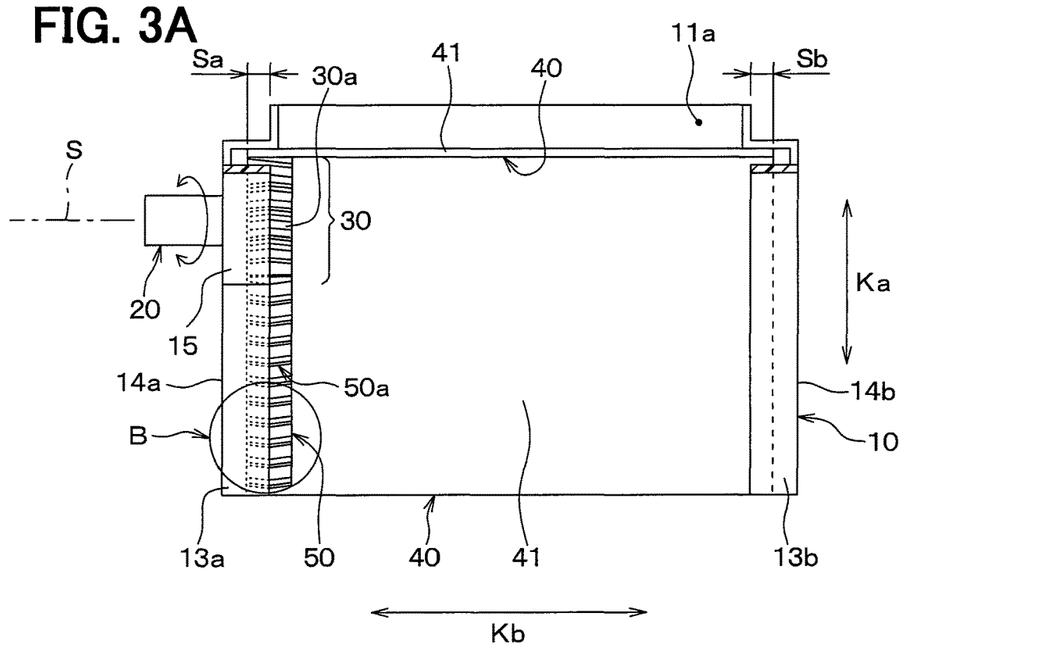
FIG. 3A is a cross-sectional view taken along a line III-III in FIG. 2.
Figure 3B:
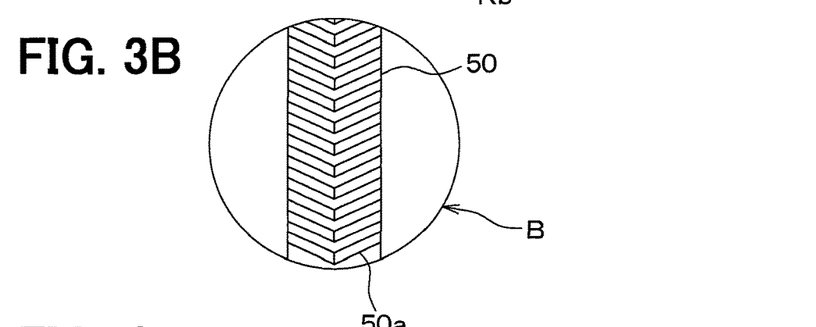
FIG. 3B is an enlarged view of a portion B in FIG. 3A.

The teeth 30a of the drive gear 30 are placed to mesh with the teeth 50a of the sliding gear 50. The drive gear 30 of the present embodiment is a double helical gear. As shown in FIG. 3B, the sliding gear 50 is also a double helical gear. Accordingly, each of the drive gear 30 and the sliding gear 50 is a gear extending obliquely with respect to the axis line S. FIG. 3B is an enlarged view of a portion B in FIG. 3. However, in FIG. 3B, the rail 13a is omitted.

More specifically, each tooth 30a of the drive gear 30 extends toward one side of the center in the width direction Kb (that is, the left side in FIG. 3A) toward the center in the width direction Kb, toward one side in the circumferential direction about the axis line S. Further, each tooth 30a of the drive gear 30 extends on the other side of the center in the width direction Kb (that is, on the right side in FIG. 3A) to the opposite side to the one side in the circumferential direction about the axis line S as a distance from the width direction Kb increases.

Each tooth 50a of the sliding gear 50 extends to one side in the sliding direction Ka (that is, to the lower side in FIG. 3A) as the tooth 50a approaches the center in the width direction Kb on one side of the center in the width direction Kb (that is, on the left side in FIG. 3A). In addition, each tooth 50a of the sliding gear 50 extends to the opposite side to the one side (that is, on upper side in FIG. 3A) in the sliding direction Ka as the tooth 50a is away from the center in the width direction Kb, on the other side (that is, on the right side in FIG. 3A) of the center of the width direction Kb.

For that reason, the drive gear 30 configures a thrust prevention mechanism that restricts the slide door 40 from deviating in the width direction Kb by restricting the sliding gear 50 from deviating in the width direction Kb when the drive gear 30 rotates.

Next, the operation of the interior air conditioning unit 1 according to the present embodiment will be described.

First, the shaft 20 is rotated to one side in the rotation direction about the axis line S. Along with the rotation, the drive gear 30 rotates to one side in the rotation direction about the axis line S. In this example, the teeth 20a of the drive gear 30 and the teeth 50a of the sliding gear 50 mesh with each other. For that reason, a driving force acting on the drive gear 30 in one direction of the sliding direction Ka is applied from the drive gear 30 through the sliding gear 50. Therefore, the slide door 40 slides in one side of the sliding direction Ka while being supported by the rails 13a and 13b. Thereafter, the door main body 41 of the slide door 40 closes the air passage 11a.

Next, the shaft 20 is rotated to the other side in the rotation direction about the axis line S. Along with the above rotation, the drive gear 30 rotates to the other side in the rotation direction about the axis line S. For that reason, a driving force acting on the drive gear 30 in the other direction of the sliding direction Ka is applied from the drive gear 30 through the sliding gear 50. Therefore, the slide door 40 slides in the other side of the sliding direction Ka while being supported by the rails 13a and 13b. Thereafter, the door main body 41 of the slide door 40 opens the air passage 11a.

In this manner, with the rotation of the drive gear 30, the slide door 40 is slid to open and close the air passage 11a. At this time, since the double helical gear is used as the drive gear 30 and the sliding gear 50, the drive gear 30 restricts the sliding gear 50 from deviating in the width direction Kb. As a result, the slide door 40 is restricted from deviating in the width direction Kb.

According to the present embodiment described above, the interior air conditioning unit 1 includes the casing 10, the slide door 40, and the drive gear 30 which form the air passage 11a. The slide door 40 is supported so as to be slidable, and includes the door main body 41 that opens and closes the air passage 11a by sliding, and the sliding gear 50 that is disposed on one side of the door main body 41 in the width direction and has the teeth 50a formed over the sliding direction Ka.

The drive gear 30 is configured so as to be freely rotatable about an axis line S extending in the width direction Kb, and the teeth 30a are formed in a circumferential direction about the axis line S, and placed so that the teeth 30a and 50a mesh with each other. When the drive gear 30 rotates, a driving force is transmitted from the drive gear 30 to the slide door 40 through the sliding gear 50, thereby sliding the slide door 40. The drive gear 30 and the sliding gear 50 each configure a double helical gear as a thrust prevention mechanism.

As described above, it is possible to restrict the slide door 40 from deviating in the width direction.

Further, in the present embodiment, the shaft 20 and the drive gear 30 are installed only on one side of the slide door 40 in the width direction Kb. For that reason, a ratio occupied by the shaft 20 and the drive gear 30 in the air passage 11a can be reduced as compared with the case in which the shaft 20 and the drive gear 30 are disposed on one side and the other side of the slide door 40 in the width direction Kb, respectively. For that reason, it is possible to restrict an increase in the draft resistance in the air passage 11a.

For example, when the drive gear 30 and the sliding gear 50 are spur gears, if the slide door 40 is driven by the drive gear 30, the slide door 40 may deviate in the width direction Kb. For that reason, in order to maintain a sealing property for closing a space between the slide door 40 and the blowing opening portion 11, there is a need to set an opening area of the blowing opening portion 11 to be small with respect to the slide door 40, and therefore, there has been a problem that a draft resistance of the air passage 11a increases.

On the other hand, according to the present embodiment, as described above, with the use of the double helical gears as the drive gear 30 and the sliding gear 50, the slide door 40 can be restricted from deviating in the width direction Kb. Therefore, there is no need to reduce the opening area of the blowing opening portion 11 with respect to the slide door 40 in order to maintain the sealing property for closing the opening of the blowing opening portion 11 by the slide door 40, and the draft resistance of the air passage 11a can be restricted from increasing.

Second Embodiment

Figure 4:
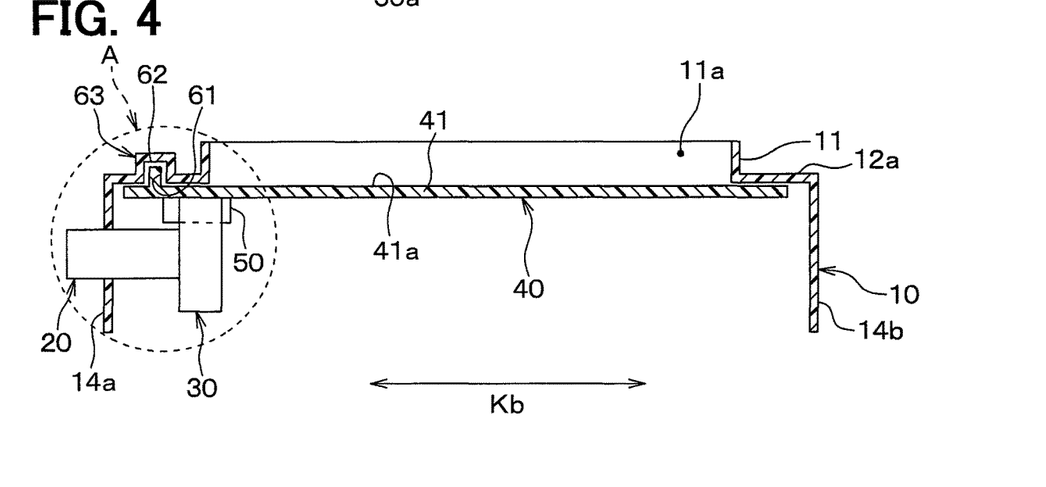
FIG. 4 is a cross-sectional view of the vicinity of a blowing opening portion and a gear in the interior air conditioning unit according a second embodiment, which corresponds to a cross-sectional view taken along a line IV-IV in FIG. 2.
Figure 5:
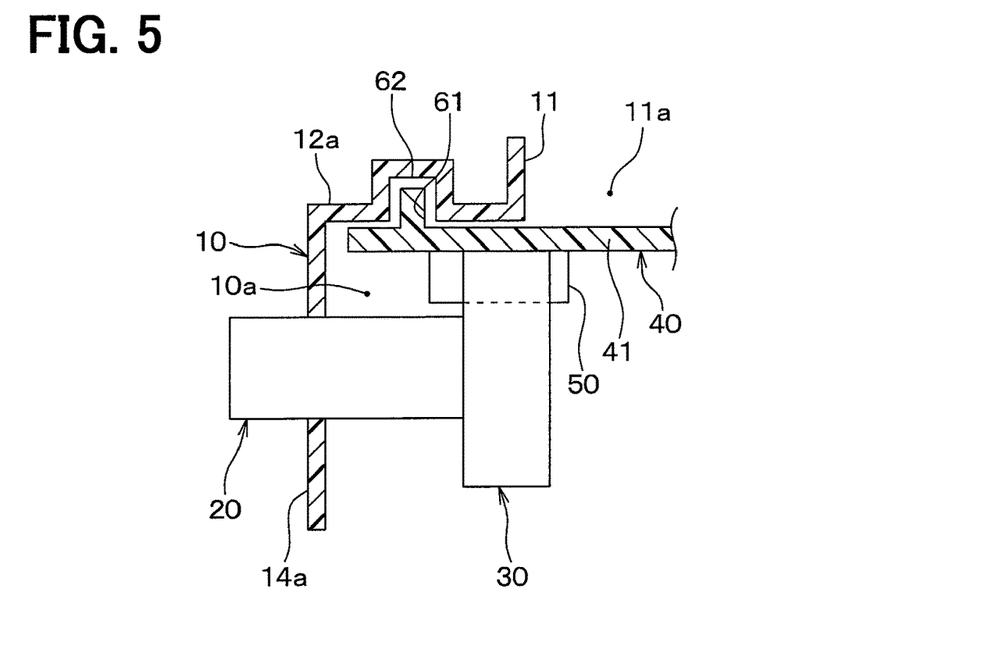
FIG. 5 is an enlarged view of a portion A in FIG. 4.

In the first embodiment, in order to restrict the slide door 40 from deviating in the width direction Kb, the double helical gears functioning as the thrust prevention mechanism are used as the drive gear 30 and the sliding gear 50, but instead, an example in which a thrust prevention mechanism 60 is configured by a slide door 40 and a casing 10 will be described with reference to FIGS. 4 and 5.

Since the configuration other than the thrust prevention mechanism 60 of the interior air conditioning unit 1 according to the present embodiment is the same as the interior air conditioning unit 1 according to the first embodiment, a description of the other configuration is omitted.

The thrust prevention mechanism 60 is configured by a rib 61 and a recess portion 62. The rib 61 is a protrusion portion that protrudes from a surface 41a of a door main body 41 toward one side in a thickness direction. The rib 61 corresponds to the protrusion portion. The recess portion 62 is a recess portion that is concave to one side of an upper surface 12a of the casing 10 in a thickness direction.

The recess portion 62 is disposed on one side a blowing opening portion 11 in a width direction Kb. The rib 61 and the recess portion 62 are formed so that the rib 61 enters the recess portion 62. As a result, the casing 10 supports the slide door 40 through the rib 61 from the width direction Kb. In other words, the drive gear 30 and the sliding gear 50 configure a thrust prevention mechanism for limiting the slide door 40 from deviating in the width direction Kb when the slide door 40 is driven by the drive gear 30.

In the present embodiment, since the rib 61 is placed in the recess portion 62, a gap between the casing 10 including the recess portion 62 and the door main body 41 including the rib 61 is formed in a labyrinth shape. For that reason, the casing 10 including the recess portion 62 and the door main body 41 including the rib 61 configure a labyrinth seal structure (that is, a labyrinth mechanism) for limiting an air from flowing through a gap between the recess portion 62 and the rib 61.

Next, the operation of the interior air conditioning unit 1 according to the present embodiment will be described.

First, the shaft 20 is rotated to one side in the rotation direction about the axis line S. Along with the rotation, the drive gear 30 rotates to one side in the rotation direction about the axis line S. For that reason, a driving force acting on the drive gear 30 in one direction of the sliding direction Ka is applied from the drive gear 30 through the sliding gear 50. Therefore, the slide door 40 slides in one side of the sliding direction Ka while being supported by the rails 13a and 13b.

At this time, since the rib 61 of the slide door 40 enters the recess portion 62 of the casing 10, the slide door 40 slides in one side of a sliding direction Ka in a state where the slide door 40 is supported by the casing 10. Thereafter, the door main body 41 of the slide door 40 closes the air passage 11a.

In this example, the casing 10 including the recess portion 62 and the slide door 40 including the rib 61 configure a labyrinth seal structure. For that reason, in a state in which the slide door 40 closes the air passage 11a, the air flow is restricted from flowing through the gap 70 between an inner side 10a and an outer side of the casing 10.

Next, the shaft 20 is rotated to the other side in the rotation direction about the axis line S. Along with the above rotation, the drive gear 30 rotates to the other side in the rotation direction about the axis line S. For that reason, a driving force acting on the drive gear 30 in the other direction of the sliding direction Ka is applied from the drive gear 30 through the sliding gear 50. Therefore, the slide door 40 slides in the other side of the sliding direction Ka while being supported by the rails 13a and 13b.

At this time, the slide door 40 slides toward the other side in the sliding direction Ka while being supported by the casing 10. For that reason, the door main body 41 of the slide door 40 opens the air passage 11a.

In this manner, the slide door 40 slides in the sliding direction Ka without contacting side surfaces 14a and 14b of the casing 10 while being supported by the casing 10. As a result, the slide door 40 opens and closes the air passage 11a.

According to the present embodiment described above, in the interior air conditioning unit 1, the casing 10 is provided with the recess portion 62 provided so as to be concave in the thickness direction orthogonal to the width direction Kb and orthogonal to the sliding direction Ka. The door main body 41 of the slide door 40 is provided with a rib 61 formed so as to protrude in the thickness direction. The recess portion 62 and the rib 61 configure a thrust prevention mechanism for limiting the movement of the door main body 41 in the width direction Kb in a state where the rib 61 enters the recess portion 62.

As described above, similarly to the first embodiment, the slide door 40 can be restricted from deviating in the width direction.

In the present embodiment, as described above, the casing 10 including the recess portion 62 and the door main body 41 including the rib 61 configure a labyrinth seal structure. For that reason, an air flow is restricted from flowing through a gap 70 between the inner side 10a and the outer side of the casing 10.

In the present embodiment, the slide door 40 and the casing 10 configure the thrust prevention mechanism 60. For that reason, as the drive gear 30 and the sliding gear 50, a spur gear can be used instead of the double helical gear.

Third Embodiment

Figure 6:
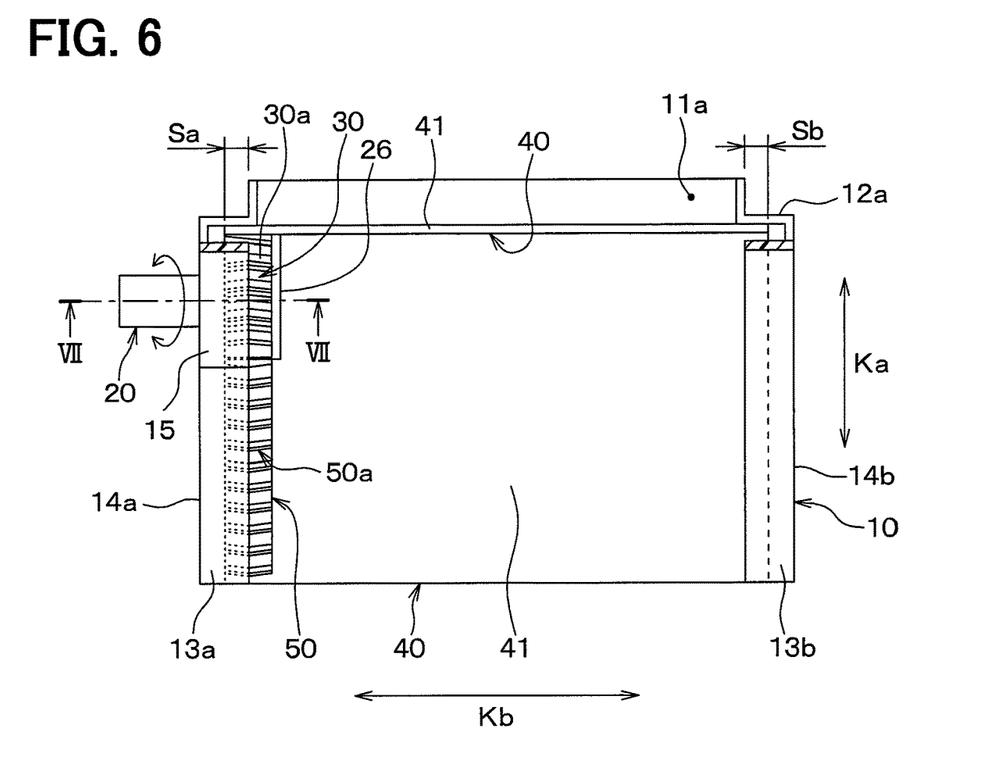
FIG. 6 is a cross-sectional view of the vicinity of a blowing opening portion and a gear in an interior air conditioning unit according to a third embodiment.
Figure 7:
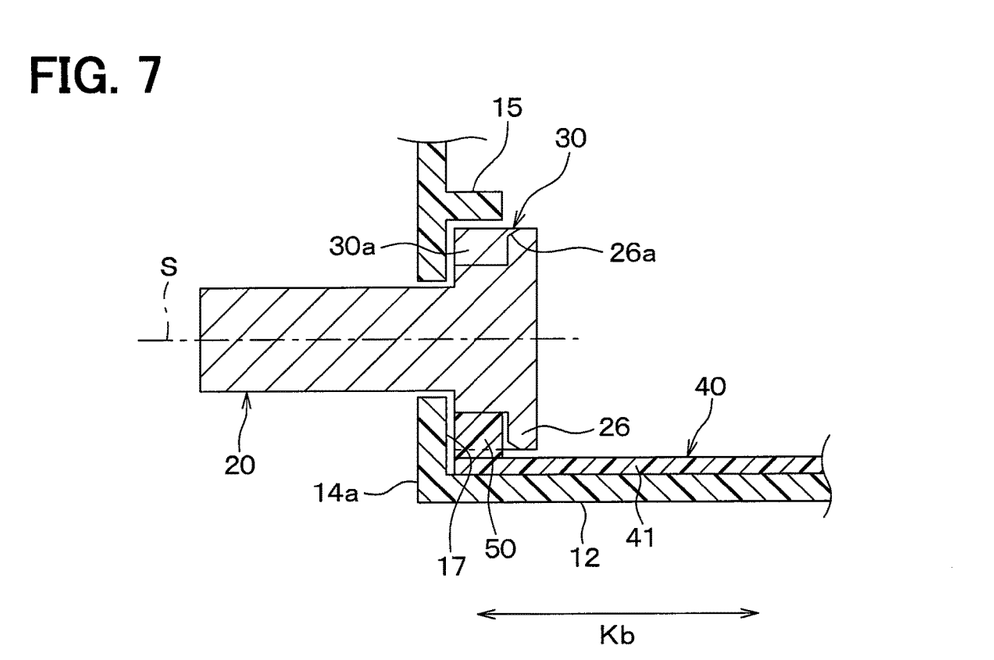
FIG. 7 is a diagram corresponding to a cross-sectional view taken along a line VII-VII in FIG. 6.

In the second embodiment, an example in which the thrust prevention mechanism is configured by the slide door 40 and the casing 10 has been described, but an example in which a thrust prevention mechanism is provided on a shaft 20 will be described with reference to FIGS. 6 and 7.

The shaft 20 according to the present embodiment is provided with a support portion 26 as a first support portion. The support portion 26 is support portioned by the shaft 20. The support portion 26 is disposed on the other side of the drive gear 30 in a width direction Kb. As a result, the support portion 26 is disposed on the other side of a sliding gear 50 in the width direction Kb.

Specifically, the support portion 26 is formed to project toward radially outer side from the shaft 20 about an axis line S and to be annular about the axis line S. As will be described later, the support portion 26 rotates together with the shaft 20 to support the sliding gear 50 from the other side in the width direction Kb.

The casing 10 configures an inner wall 17 that supports the sliding gear 50 from one side in the width direction Kb. The inner wall 17 is formed on the other side of a side surface 14a of the casing 10 in the width direction. The inner wall 17 is a second support portion that restricts the slide door 40 from deviating in the width direction Kb.

In the present embodiment, the support portion 26 and the inner wall 17 configure a thrust prevention mechanism that supports the slide door 40 and restricts the slide door 40 from deviating in the width direction Kb.

Next, the operation of the interior air conditioning unit 1 according to the present embodiment will be described.

First, the shaft 20 is rotated to one side in the rotation direction about the axis line S. One side of the rotation direction and the other side of the rotation direction, which will be described later, are directions of rotation opposite to each other. Along with the rotation, the drive gear 30 rotates to one side in the rotation direction about the axis line S. For that reason, a driving force acting on the drive gear 30 in one direction of the sliding direction Ka is applied from the drive gear 30 through the sliding gear 50. Therefore, the slide door 40 slides in one side of the sliding direction Ka while being supported by the rails 13a and 13b.

At this time, the support portion 26 rotates together with the shaft 20 to one side in the rotation direction. In other words, the support portion 26, the shaft 20, and the drive gear 30 rotate to one side in the rotation direction. For that reason, the sliding gear 50 slides in the sliding direction Ka on one side in a state where the slide gear 50 is supported by the support portion 26 and the inner wall 17. Thereafter, the door main body 41 of the slide door 40 closes the air passage 11a.

Next, the shaft 20 is rotated to the other side in the rotation direction about the axis line S. Along with the above rotation, the drive gear 30 rotates to the other side in the rotation direction about the axis line S. For that reason, a driving force acting on the drive gear 30 in the other direction of the sliding direction Ka is applied from the drive gear 30 through the sliding gear 50. Therefore, the slide door 40 slides in the other side of the sliding direction Ka while being supported by the rails 13a and 13b.

At this time, the support portion 26 rotates together with the shaft 20 to the other side in the rotation direction. In other words, the support portion 26, the shaft 20, and the drive gear 30 rotate to the other side in the rotation direction. For that reason, the sliding gear 50 slides toward the other side of the sliding direction Ka in a state where the slide gear 50 is support portioned by the support 26 and the inner wall 17. Thereafter, the door main body 41 of the slide door 40 opens the air passage 11a.

According to the present embodiment described above, in the interior air conditioning unit 1, when the slide door 40 slides in the sliding direction Ka, the support portion 26 and the inner wall 17 can restrict the slide door 40 from deviating in the width direction Kb.

In the present embodiment, the support portion 26 and the inner wall 17 configure a thrust prevention mechanism. For that reason, as in the second embodiment, a spur gear instead of a double helical gear can be used as the drive gear 30 and the sliding gear 50.

A corner of the support portion 26 on the radially outer side and on the sliding gear 50 side according to the present embodiment configure a tapered portion 26a. The tapered portion 26a is formed in an annular shape with the axis line S as a center, and is formed in a substantially circular arc shape that is convex outward, specifically, convex in an oblique direction relative to the width direction Kb.

Therefore, the support portion 26 can be prevented from being caught by the sliding gear 50.

Modifications to the above embodiments will be described.

Figure 8:
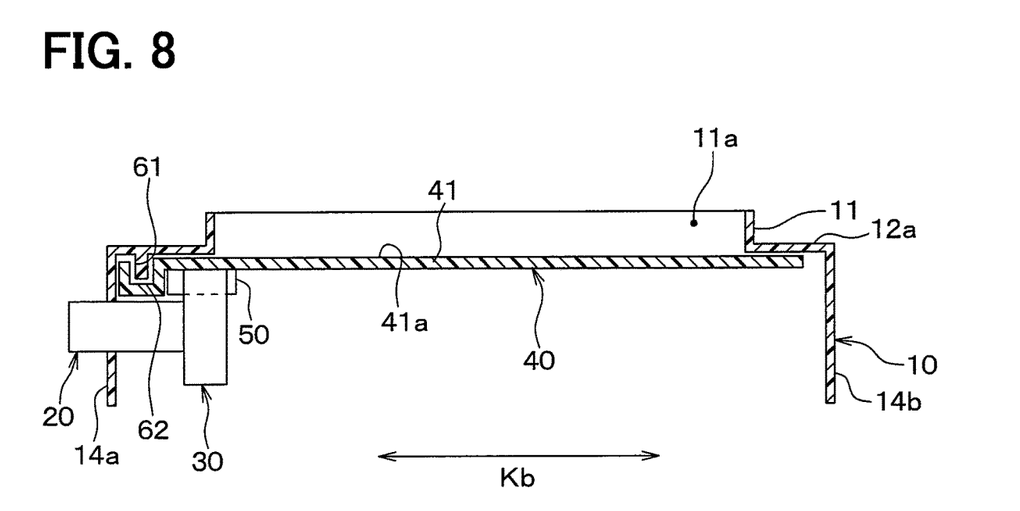
FIG. 8 is a diagram corresponding to a cross-sectional view taken along a line IV-IV in FIG. 2 according to another embodiment.

(1) In the second embodiment, an example in which the rib 61 is provided in the slide door 40 and the recess portion 62 is provided in the casing 10 has been described, but instead, as shown in FIG. 8, the recess portion 62 may be provided in the slide door 40 and the rib 61 may be provided in the casing 10.

Figure 9:
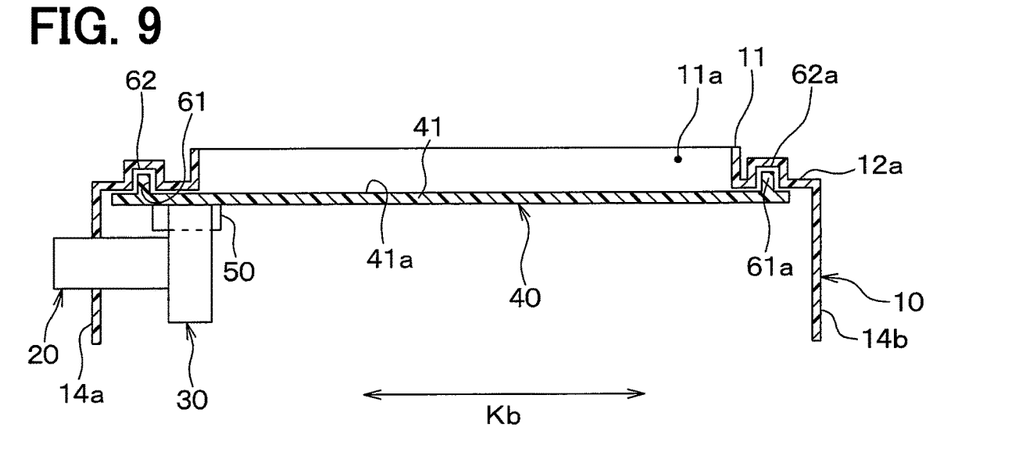
FIG. 9 is a diagram corresponding to a cross-sectional view taken along a line IV-IV in FIG. 2 according to another embodiment.

(2) In the second embodiment, an example in which the rib 61 and the recess portion 62 are provided only on one side in the width direction Kb of the door main body 41 of the slide door 40 has been described. In addition, for example, as shown in FIG. 9, a rib 61a and a recess portion 62a may also be provided on the other side of the door main body 41 of the slide door 40 in the width direction Kb. The rib 61a and the recess portion 62a have the same configurations and functions as those of the rib 61 and the recess portion 62, respectively.

Figure 10:
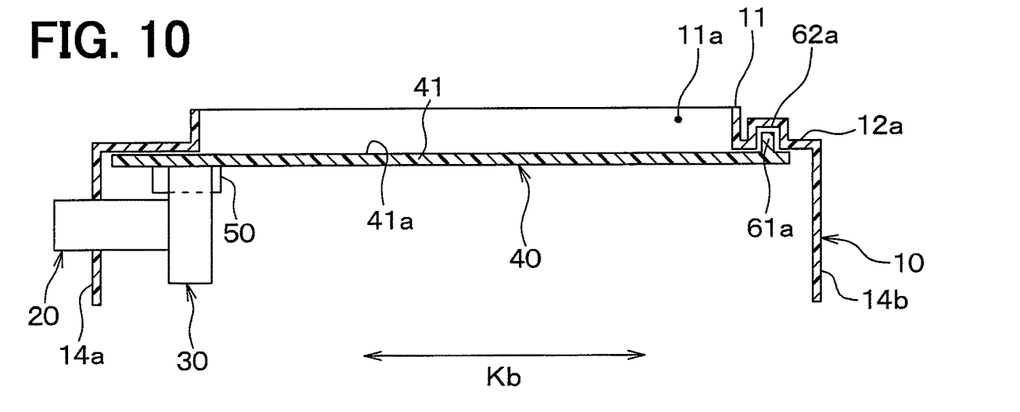
FIG. 10 is a diagram corresponding to a cross-sectional view taken along a line IV-IV in FIG. 2 according to another embodiment.

Alternatively, the rib 61 and the recess portion 62 may be omitted from the example of FIG. 9, and the rib 61a and the recess portion 62a may be provided only on the other side of the door main body 41 of the slide door 40 in the width direction Kb, as shown in FIG. 10. In other words, the rib and the recess portion may be provided only on the side opposite to the gear in the width direction Kb (on the side opposite to the sliding gear).

(3) In the first, second, and third embodiments, an example in which the opening and closing device of the present disclosure is applied to the in-vehicle air conditioner has been described, but the invention is not limited to the in-vehicle air conditioning device, and the opening and closing device of the present disclosure may be applied to various devices other than the in-vehicle air conditioning device.

(4) In the first, second, and third embodiments, an example in which the opening and closing device of the present disclosure is applied to the in-vehicle air conditioner has been described, but the invention is not limited to the in-vehicle air conditioning device, and the opening and closing device of the present disclosure may be applied to various devices other than the in-vehicle air conditioning device.

(5) In the first, second, and third embodiments, an example in which the slide door 40 of the present disclosure is the in-vehicle air conditioner mode door has been described, but the present disclosure is not limited to the in-vehicle air conditioner mode door, and the slide door 40 may be various doors such as an air mix door as long as the door is a slide door that opens and closes an air passage.

Figure 11:
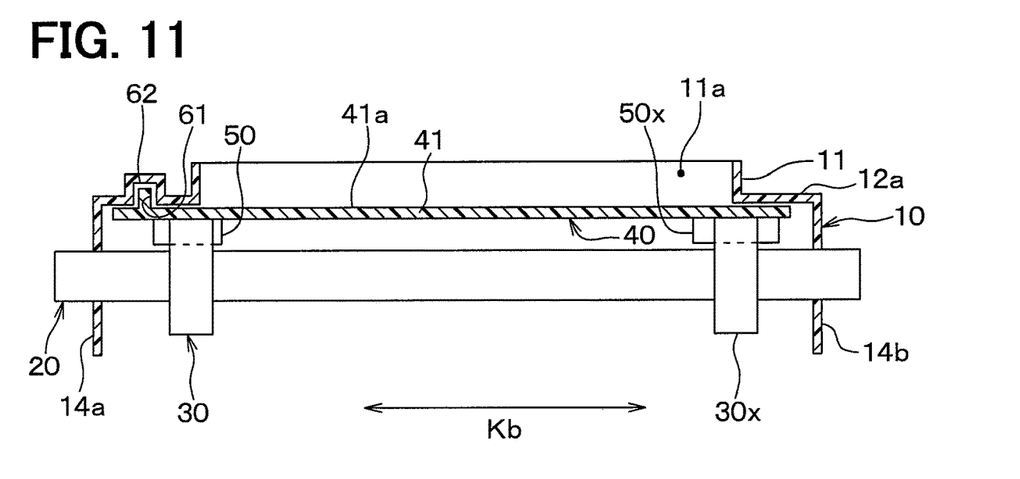
FIG. 11 is a diagram corresponding to a cross-sectional view taken along a line IV-IV in FIG. 2 according to another embodiment.

(6) In the first, second, and third embodiments, an example in which the sliding gear 50 is provided only on one side of the door main body 41 of the slide door 40 in the width direction Kb has been described. However, the above configuration is not necessarily required. For example, as shown in FIG. 11, sliding gears 50 and 50x may be provided on both of one side and the other side of the door main body 41 of the slide door 40 in the width direction Kb. In that case, a drive gear 30x corresponding to the sliding gear 50x is provided. The sliding gear 50x and the drive gear 30x have the same configurations and functions as those of the sliding gear 50 and the drive gear 30, respectively. The drive gear 30 and the drive gear 30x are connected to the same shaft 20 and rotate in synchronization with each other. Alternatively, the sliding gear 50 may be provided only on the other side of the door main body 41 of the slide door 40 in the width direction Kb.

(7) In the second embodiment, an example has been described in which the recess portion 62 is provided in the casing 10 so as to be perpendicular to the width direction Kb and to be concave in the thickness direction perpendicular to the sliding direction Ka, and the rib 61 is formed so as to project from the door main body 41 in the thickness direction, but the present disclosure is not limited to the above example, and may be configured as follows.

In other words, the direction in which the recess portion 62 is concave or the rib 61 is projected is not limited to the thickness direction described above, and any direction may be used as long as the direction intersects the width direction Kb in the casing 10 and intersects with the sliding direction Ka.

(8) In the first, second, and third embodiments, an example has been described in which the door main body 41 of the slide door 40 is a thin plate member, but instead of the above configuration, the door main body 41 of the slide door 40 may be a member having a shape other than the thin plate.

(9) In the first embodiment, an example in which the double helical gear is used as the thrust prevention mechanism has been described as the drive gear 30 and the sliding gear 50, but a gear other than the double helical gear may be used as the drive gear 30 and the sliding gear 50 as long as the sliding gear 50 is restricted from deviating in the width direction Kb with the rotation of the drive gear 30.

Figure 12A:
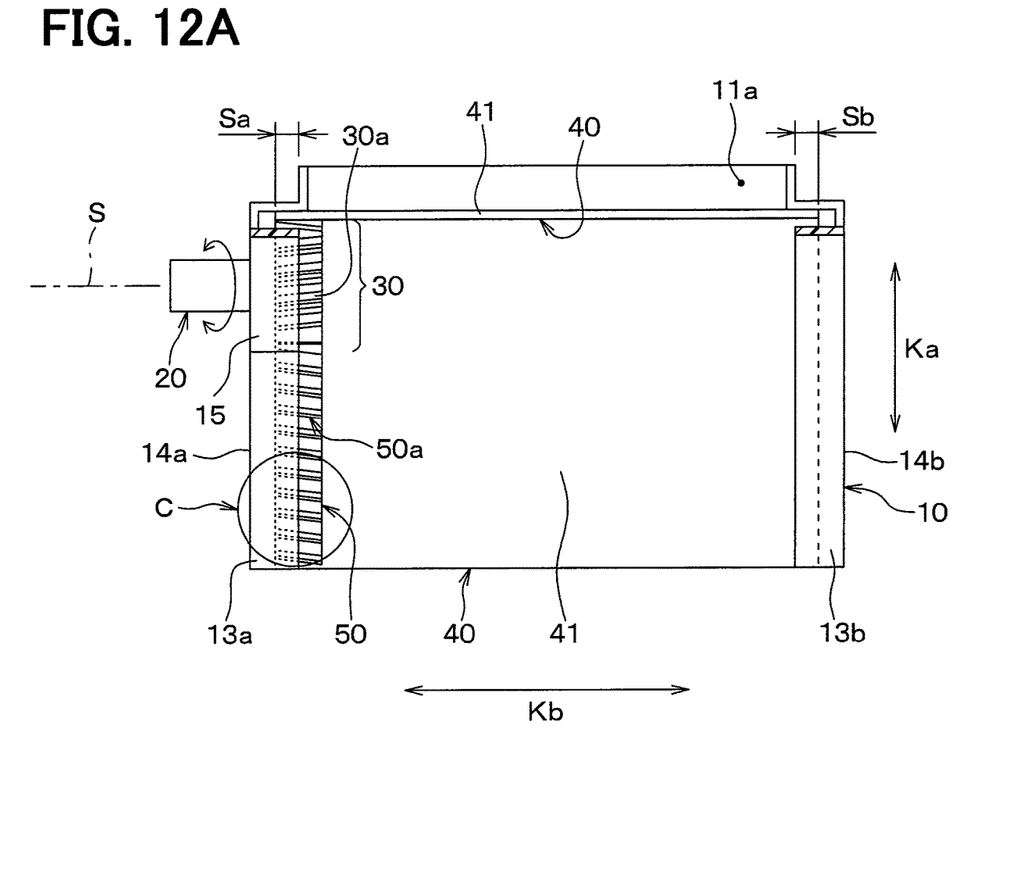
FIG. 12A is a cross-sectional view taken along a line III-III in FIG. 2 according to another embodiment.
Figure 12B:
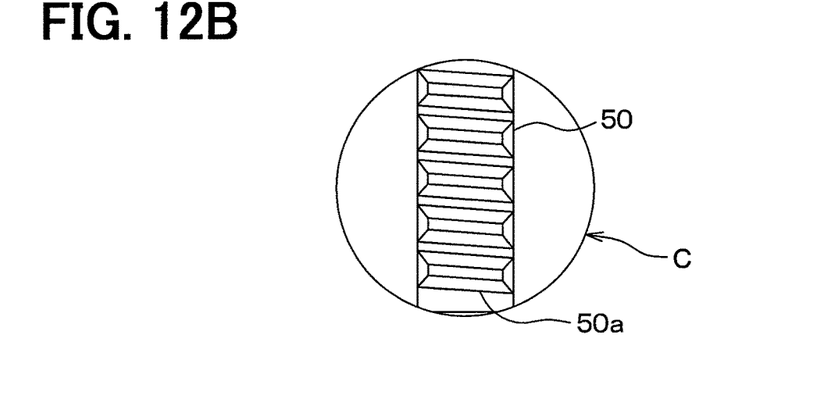
FIG. 12B is an enlarged view of a portion C in FIG. 12A.

For example, the drive gear 30 and the sliding gear 50 may be helical gears as shown in FIGS. 12A and 12B. FIG. 12A is a view in the same form as FIG. 3A in the opening and closing device of the present embodiment. FIG. 12B is an enlarged view of a portion C in FIG. 3. However, in FIG. 12B, the rail 13a is omitted.

Also in this example, each of the drive gear 30 and the sliding gear 50 is a gear extending obliquely along the axis line S. More specifically, each tooth 30a of the drive gear 30 extends toward one side in a circumferential direction about the axis line S as the tooth 30a is closer to the center in the width direction Kb on one side from the center in the width direction Kb (that is, the left side in FIG. 12A). Further, each tooth 30a of the drive gear 30 extends to the one side in the circumferential direction about the axis line S as the tooth 30a moves away from the width direction Kb on the other side from the center in the width direction Kb (on the right side in FIG. 12A.

Each tooth 50a of the sliding gear 50 extends to one side in the sliding direction Ka (that is, to the lower side in FIG. 12A) as the tooth 50a approaches the center in the width direction Kb on one side from the center in the width direction Kb (that is, on the left side in FIG. 12A). Each tooth 50a of the sliding gear 50 extends to the one side of the sliding direction Ka as the tooth 50a moves away from the center of the width direction Kb on the other side from the center in the width direction Kb (on the right side in FIG. 12A).

(10) It should be noted that the present disclosure is not limited to the embodiments described above, and can be modified as appropriate. The above embodiments are not independent of each other, and can be appropriately combined together except when the combination is obviously impossible. In each of the above embodiments, it is needless to say that the elements configuring the embodiment are not necessarily indispensable except when it is clearly indicated that the elements are particularly indispensable, when the elements are clearly considered to be indispensable in principle, and the like. Further, in each of the above embodiments, when numerical values such as the number, numerical value, quantity, range, and the like of the components of the embodiment are referred to, except in the case where the numeral values are expressly indispensable in particular, the case where the numerical values are obviously limited to a specific number in principle, and the like, the present invention is not limited to the specific number. Further, in each of the above-mentioned embodiments, when referring to the shape, positional relationship, and the like of a component and the like, the component is not limited to the shape, positional relationship, and the like, except for the case where the shape, the positional relationship or the like is specifically specified, the case where the shape, the positional relationship or the like is fundamentally limited to a specific shape, positional relationship, and the like.

To sum up, in a first aspect described in a part or all of the above first, second and third embodiments and the other embodiments, an opening and closing device includes a casing that defines an air passage, a slide door that includes a door main body that is configured to be slidable in a sliding direction to open or close the air passage, and a sliding gear that is disposed on one side of the door main body in its width direction and includes first teeth in the sliding direction, and a drive gear that is configured to be rotatable around its axis line extending in the width direction and that includes second teeth in a circumferential direction around the axis line such that the first teeth and the second teeth are arranged in engagement with each other. When the drive gear rotates, a driving force is transmitted from the drive gear to the slide door through the sliding gear to slide the slide door. The door main body is configured to be restricted from shifting in the width direction due to the rotation of the drive gear.

Specifically, in a second aspect, the drive gear is configured to support the sliding gear and to restrict the sliding gear from shifting in the width direction, thereby restricting the door main body from shifting in the width direction.

In a third aspect, each of the drive gear and the sliding gear is a gear extending obliquely relative to the axis line. This makes it possible to restrict the slide door from deviating in the width direction with a simple configuration.

In a fourth aspect, a double helical gear is used for each of the drive gear and the sliding gear. This makes it possible to restrict the slide door from deviating in the width direction with a simple configuration.

In a fifth aspect, the casing is configured to support the door main body to restrict the door main body from shifting in the width direction.

Specifically, in a sixth aspect, one member of the casing and the door main body includes a recess portion that is formed to be recessed in an intersecting direction intersecting with the width direction as well as the sliding direction. The other member of the casing and the door main body than the one member includes a protrusion portion that is formed to project in the intersecting direction. The casing is configured to support the door main body in a state where the protrusion portion is in the recess portion to restrict the door main body from moving in the width direction.

As a result, the slide door can be restricted from deviating in the width direction with a simple configuration such as a protrusion portion and a recess portion.

In a seventh aspect, the one member including the recess portion and the other member including the protrusion portion constitute a labyrinth mechanism that is configured to limit an air flow into a gap defined between the recess portion and the protrusion portion.

In an eighth aspect, the opening and closing device further includes a support portion that is configured to support the sliding gear from the other side thereof in the width direction to restrict the door main body from shifting to the other side in the width direction.

Specifically, in an ninth aspect, the opening and closing device further includes a shaft that is configured to be rotatable around the axis line. The drive gear is provided radially outward of the shaft around the axis line. The support portion is disposed on the other side of the sliding gear in the width direction, and is provided radially outward of the shaft. The support portion is configured to rotate together with the drive gear in accordance with the rotation of the shaft.

As a result, with the provision of the shaft with the support portion, the slide door can be restricted from deviating in the other direction in the width direction.

In a tenth aspect, the support portion is a first support portion that is configured to restrict the sliding gear from shifting to the other side in the width direction. The casing includes a second support portion that is configured to support the sliding gear from the one side in the width direction to restrict the sliding gear from shifting to the one side in the width direction.

As a result, the slide door can be restricted from deviating in the width direction by the first support portion and the second support portion.

An opening and closing device in an aspect of the present disclosure includes a casing that defines an air passage, a slide door that includes a door main body that is configured to be slidable in a sliding direction to open or close the air passage, and a sliding gear that is disposed on one side of the door main body in its width direction and includes first teeth in the sliding direction, and a drive gear that is configured to be rotatable around its axis line extending in the width direction and that includes second teeth in a circumferential direction around the axis line such that the first teeth and the second teeth are arranged in engagement with each other. When the drive gear rotates, a driving force is transmitted from the drive gear to the slide door through the sliding gear to slide the slide door. The door main body is configured to be restricted from shifting in the width direction due to the rotation of the drive gear.

Therefore, it is possible to provide an opening and closing device which restricts the slide door from deviating in the width direction.

However, the width direction of the slide door is a direction orthogonal to the sliding direction of the door main body and orthogonal to the thickness direction.

What is claimed is:

1. An opening and closing device comprising:
a casing that defines an air passage;
a slide door that includes:
    a door main body that is configured to be slidable in a sliding direction to open or close the air passage; and
    a sliding gear that is disposed only on one side of the door main body in its width direction and includes first teeth in the sliding direction; and
a drive gear that is configured to be rotatable around its axis line extending in the width direction and that includes second teeth in a circumferential direction around the axis line such that the first teeth and the second teeth are arranged in engagement with each other, wherein:
when the drive gear rotates, a driving force is transmitted from the drive gear to the slide door through the sliding gear to slide the slide door;
the door main body is configured to be restricted from shifting in the width direction due to the rotation of the drive gear;
the drive gear is configured to support the sliding gear and to restrict the sliding gear from shifting in the width direction, thereby restricting the door main body from shifting in the width direction due to the rotation of the drive gear;
each of the drive gear and the sliding gear is a double helical gear extending obliquely relative to the axis line;
when approaching the center of the drive gear in the width direction, the second teeth of the drive gear on the one side in the width direction extend toward one side in the circumferential direction around the axis line;
when distanced away from the center of the drive gear in the width direction, the second teeth of the drive gear on the other side in the width direction extend toward an opposite side from the one side in the circumferential direction around the axis line;
when approaching the center of the sliding gear in the width direction, the first teeth of the sliding gear on the one side in the width direction extend toward one side in the sliding direction; and
when distanced away from the center of the sliding gear in the width direction, the first teeth of the sliding gear on the other side in the width direction extend toward an opposite side from the one side in the sliding direction.

2. An opening and closing device comprising:
a casing that defines an air passage;
a slide door that includes:
    a door main body that is configured to be slidable in a sliding direction to open or close the air passage; and
    a sliding gear that is disposed only on one side of the door main body in its width direction and includes first teeth in the sliding direction; and
a drive gear that is configured to be rotatable around its axis line extending in the width direction and that includes second teeth in a circumferential direction around the axis line such that the first teeth and the second teeth are arranged in engagement with each other, wherein:
when the drive gear rotates, a driving force is transmitted from the drive gear to the slide door through the sliding gear to slide the slide door; and
the opening and closing device further comprising a support portion that is configured to support the sliding gear from the other side thereof in the width direction to restrict the door main body from shifting to the other side in the width direction due to the rotation of the drive gear,
the opening and closing device further comprising a shaft that is configured to be rotatable around the axis line, wherein:
the drive gear is provided radially outward of the shaft around the axis line;
the support portion is disposed on the other side of the sliding gear in the width direction, and is provided radially outward of the shaft; and
the support portion is configured to rotate together with the drive gear in accordance with the rotation of the shaft.

3. The opening and closing device according to claim 2, wherein:
the support portion is a first support portion that is configured to restrict the sliding gear from shifting to the other side in the width direction; and
the casing includes a second support portion that is configured to support the sliding gear from the one side in the width direction to restrict the sliding gear from shifting to the one side in the width direction.

* * * * *